United States Patent [19]

Yamada et al.

[11] Patent Number: 4,519,691

[45] Date of Patent: May 28, 1985

[54] PHOTOGRAPHIC TAKING LENS DRIVING MEANS

[75] Inventors: Minoru Yamada; Eiji Ito; Masaru Nagai, all of Hachioji, Japan

[73] Assignee: Konishiroku Photo Industry Co., Ltd., Tokyo, Japan

[21] Appl. No.: 585,768

[22] Filed: Mar. 2, 1984

[30] Foreign Application Priority Data

| Mar. 4, 1983 | [JP] | Japan | 58-35636 |
| Mar. 4, 1983 | [JP] | Japan | 58-35637 |
| Mar. 4, 1983 | [JP] | Japan | 58-35638 |
| Mar. 4, 1983 | [JP] | Japan | 58-31289[U] |
| Mar. 4, 1983 | [JP] | Japan | 58-31290[U] |

[51] Int. Cl.³ .............................................. G03B 3/10
[52] U.S. Cl. ................................. 354/400; 354/195.1; 352/140; 350/255
[58] Field of Search ..................... 354/400, 195.1; 352/140; 350/255

[56] References Cited

U.S. PATENT DOCUMENTS

| 4,152,060 | 5/1979 | Specht | 354/400 |
| 4,194,811 | 3/1980 | Barry | 354/195.1 |
| 4,291,958 | 9/1981 | Frank et al. | 352/140 |
| 4,303,324 | 12/1981 | Marcus | 350/255 |
| 4,423,941 | 1/1984 | Iwata et al. | 354/195.1 |
| 4,466,725 | 8/1984 | Hirohata | 354/400 |
| 4,472,024 | 9/1984 | Konomura et al. | 350/255 |

Primary Examiner—Russell E. Adams
Attorney, Agent, or Firm—Jordan B. Bierman

[57] ABSTRACT

The invention describes a taking lens driving system using permanent magnets provided inside of the lens barrel. A plurality of movable coils surround the circumference of the taking lens and are arranged so as to transverse the magnetic flux of the permanent magnets. At least one of the movable coil members drives the taking lens unit, while the other coils are used to the range of movement of the movable coil member.

8 Claims, 11 Drawing Figures

PHOTOGRAPHIC TAKING LENS DRIVING MEANS

BACKGROUND OF THE INVENTION

1. Field of the Invention

This invention relates to a photographic taking lens driving means which electromagnetically drives a photographic taking lens unit so as to bring a subject into focus or the like.

2. Description of the Prior Art

With the spread of the miniaturization of cameras in size and of collapsible mount type cameras which are so designed as to stow the taking lens barrel into the camera body, it has become difficult to drive various driving mechanisms such as a shutter mechanism, a taking lens driving mechanism, a film winding mechanism and the like by means of a single driving power source such as a built-in motor of a camera body, because of the space for them to occupy. In other words, the reason thereof is that such a driving power source cannot help being bulky if an adequate power should be generated thereby, and the power transmission mechanism must be complicated, so that those mechanisms cannot be stowed in such a small space. Particularly, in a collapsible mount type camera of which the taking lens barrel is retractable, the power transmission mechanism to the taking lens driving mechanism is still more complicated, so that a large space must be taken up for those mechanisms.

Accordingly, the latest models of cameras have a tendency to use electromagnetic driving devices each to every mechanism so as to miniaturize the driving power source thereof and to simplify or disuse the power transmission mechanism thereof.

The similar tendency may be said of the case that a lens unit is driven for focusing or the like. There have heretofore been a system using a motor to serve as a driving power source and another system using an electromagnetic force as a driving power source. In the former system, there have been two sub-systems, i.e., one sub-system in which, as seen in lens-shutter type cameras, a taking lens is motivated to the infinite focal point by a spring at the time when a picture was taken and a film was wound up to the next frame and the taking lens is pulled forth by a motor to a position given by a distance measurement signal at the time of taking picture, and the other sub-system in which, as seen in the automatic focusing devices of single lens reflex type cameras, a taking lens is driven according to the variations of a motor revolution rate and the direction thereof demanded by a distance measurement signal. Both of the systems must be supplemented by a reduction gear, a device for converting a rotation into a rectilinear motion and the like. It has therefore become difficult to incorporate them into the latest models of cameras which are being miniaturized and lightened.

Resultantly, the electromagnetic driving system that is the latter system has been adopted. Such an electromagnetic driving means for driving a taking lens to bring into focus has been designed, on the premise that a loss possibly caused on a magnetic circuit may be reduced by narrowing the gap between the fixed permanent magnets which are arranged opposite to each other, so that the taking lens unit may be driven by a movable coil member arranged inside the gap. Therefore, this means cannot select any but the two-step control in the two directions of currents applied, i.e., one direction from the infinity to the closest range and the other direction from the closest range to the infinity, so that the taking lens may not be moved multistepwise. And yet, it is somehow possible to keep the taking lens unit at the mid point of the driving range thereof by utilizing the balance of a spring or by making use of a mechanical means so that the taking lens may be driven back and forth from the mid point. In this sense, it can not always say that a three-step control system may not be taken by using a piece of movable coil member. A spring tension not affected by an attitude variation is required and an electromagnetic force must be stronger than the spring tension, in order to keep the taking lens at the mid point by utilizing a spring balance. In order to keep it at the mid point mechanically, it is required to provide a supplementary device for releasing the holding member of the lens immediately before the lens driving. Anyway it was very difficult to materialize such a mechanism as mentioned above.

OBJECTS AND SUMMARY OF THE INVENTION

This invention is to solve the above-mentioned problems, and it is therefore an object of the invention to provide a photographic taking lens driving means capable of moving a taking lens unit back and forth and of controlling the moving range, which is simply constructed with a plurality of movable coil members arranged around the lens so as to traverse the magnetic flux of a magnetic circuit formed by fixed permanent magnets.

DESCRIPTION OF THE PREFERRED EMBODIMENTS

Figure 1:
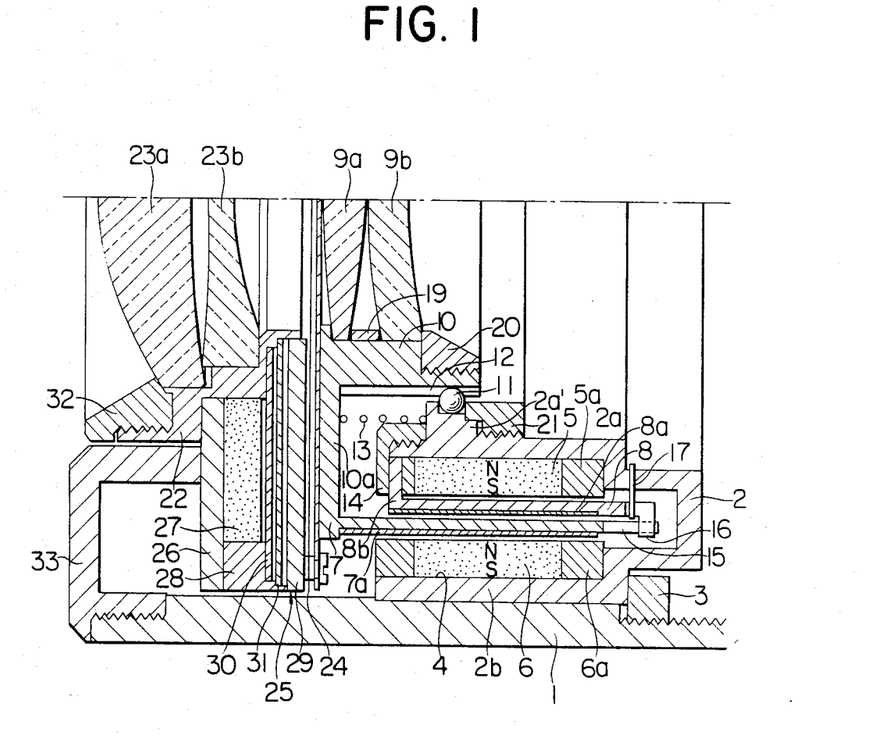
FIG. 1 is a cross-sectional view of a taking lens barrel embodied by the invention.
Figure 2:
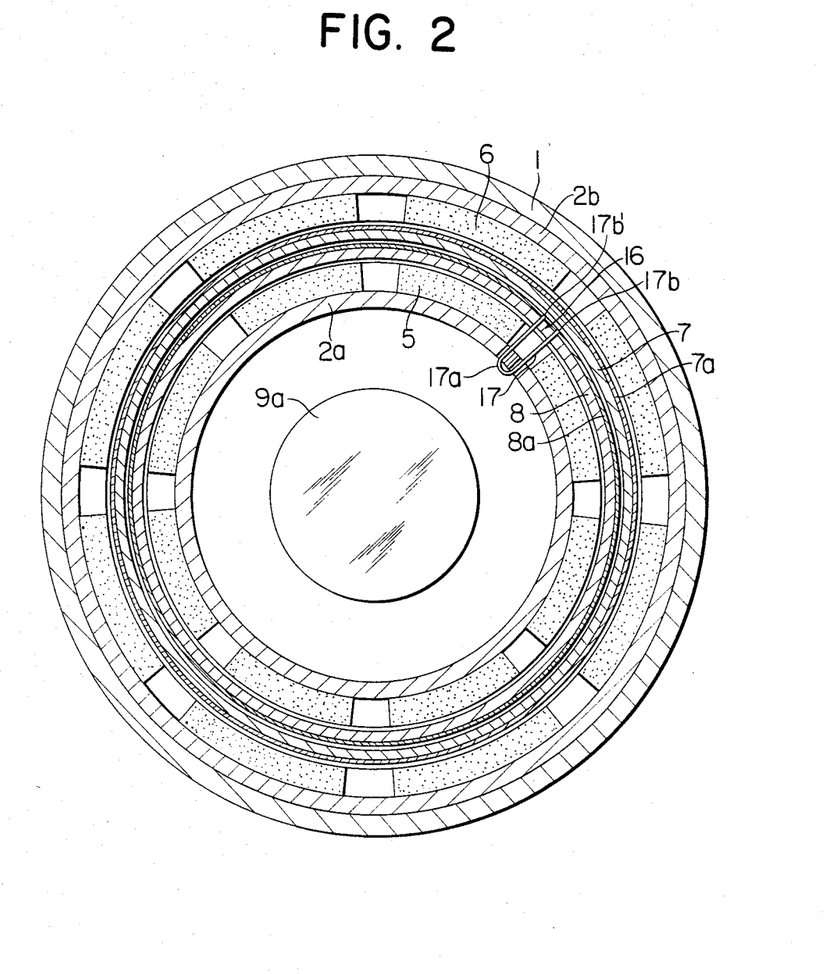
FIG. 2 is a cross-sectional view of a taking lens barrel embodied by the invention in which the arrangements of fixed permanent magnets are shown.

The invention will become apparent from the following description of embodiments with reference to the accompanying drawings;

In FIGS. 1, 2, numeral 1 is a taking lens barrel. Cylindrically formed yoke 2 is fixed by stopper ring 3 to the inner surface of the base of the taking lens barrel 1. The yoke 2 is provided with a concave groove 4 to the surface of the head thereof, and inner ring 2a and outer ring 2b are arranged with the interposition of the space of the concave groove 4.

Numerals 5, 6 are fixed permanent magnets arranged cylindrically to the outer surface of the inner ring 2a and to the inner surface of the outer ring 2b of the yoke 2, respectively. The fixed permanent magnets 5, 6 are held by cylinder-shaped holders 5a, 6a. Fixed permanent magnets 5, 6, facing respectively inward and outward take the form of a magnetic circuit because one polarity is opposite to the mating polarity. The magnetic circuit embodied in this example is constructed by providing fixed permanent magnets face to face directly. Besides, it is also allowed to construct the circuit in the way that a fixed permanent magnet is confronted by a yoke magnetized by the fixed permanent magnet, or in the way that yokes each magnetized by the fixed permanent magnets are faced to each other.

Figure 5:
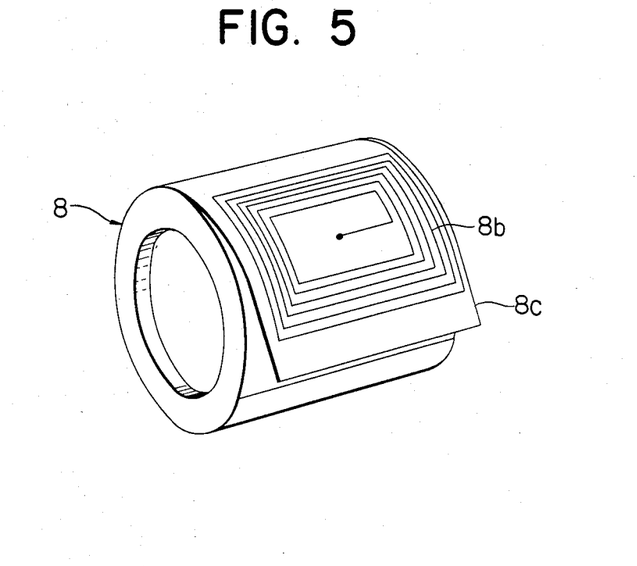
FIG. 5 is a perspective view illustrating the forming process of a movable coil member to be used in an embodiment of the invetion.

Numerals, 7, 8, are cylinder-shaped movable coil members having coil patterns 7a, 8a on the outer circumferential surfaces, respectively. These are arranged between the described fixed permanent magnets 5 and 6. To be more concrete, 7, 8 are cylinder-shaped movable coil members each arranged between the described fixed permanent magnets 5 and 6. These movable coil members 7, 8 are manufactured in the manner that flexible printed boards 7c, 8c onto which scroll-shaped or wavelike patterns 7a, 8a formed are tightly adhered by an adhesive or the like to the outer surfaces of cylinder-shaped substrates 7b, 8b made of a non-magnetic member such as a synthetic resin. FIG. 5 shows a process of forming such a movable coil member.

One of the movable coil member (hereinafter called the primary movable coil member) is to drive lens frame 10 into which rear lens groups 9a, 9b are fitted, while the other movable coil member (hereinafter called the secondary movable coil member) is to control the movable range of the primary movable coil member.

The described primary movable coil member 7 is fixed in a body to flange 10a provided to the outer surface of the head of lens frame 10 which is provided reciprocatably through guide groove 12 to ball bearings 11 arranged to flange 2a' which is provided along the inner circumference of the described yoke 2. The lens frame 10 is, however, pressed forward (in the left in the drawing) by spring 13, in an ordinary state.

Figure 3A:
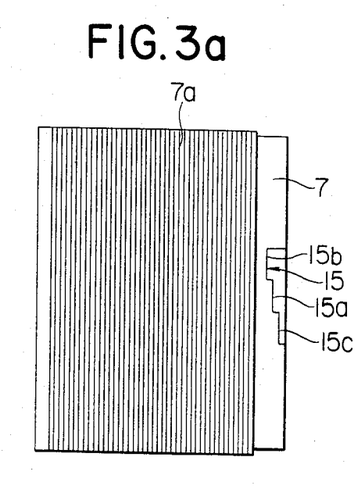
FIGS. 3, 4 each are the relational views illustrating the coil patterns used in the embodiments of the invention in which the relation between the primary movable coil member and the secondary movable coil member is shown.
Figure 3B:
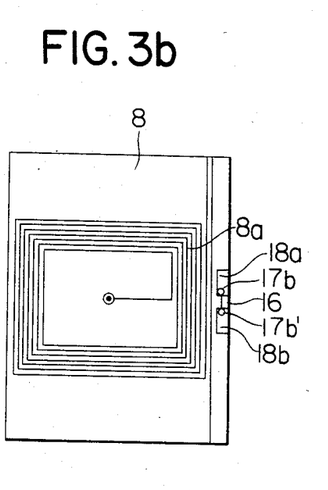
Figure 4A:
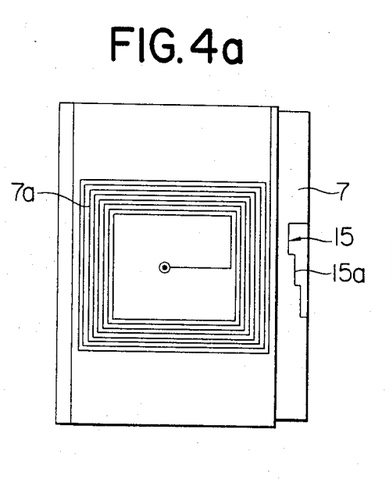
Figure 4B:
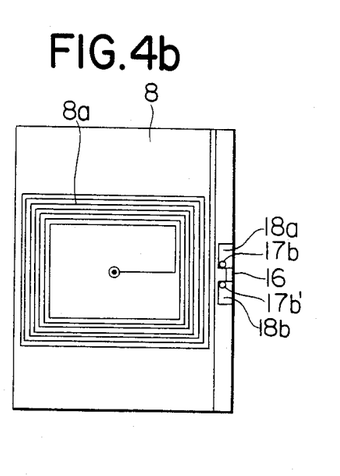

The lens frame 10 reciprocates linearly or helically according to the forms of the guide groove 12. It may be free to select either of them. The windings of coil 7a of the primary movable coil member 7 are naturally different between the linear reciprocation of the lens frame 10 and the helical reciprocation thereof. In the former case, the coil 7a is wound in the direction of the circumference of primary movable coil member 7 as shown in FIG. 3, and in the latter case, it is wound in a scroll-pattern or wavy-pattern as shown in FIG. 4. Coil 7a may be wound in a scroll-pattern in such a way that the pattern is formed in advance on a flexible printed board and the printed board thus patterned is adhered to the coil member with an adhesive.

Fixed permanent magnets 5 and 6 are arranged differently according to the pattern in which the coil 7a is wound. In the case that the coil 7a is wound in the direction of the circumference of primary movable coil member 7 as shown in FIG. 3, eight fixed permanent magnets 6 provided cylindrically inside of the lens barrel are arranged so that each magnet has same polarity on the side facing to the coil 7a.

In this case, two parts of the coil 8a, in which electric currents flow parallel to the optical axis and oppositely to each other, are arranged in a position that one part is in a magnetic field generated by the permanent magnets 5 and 6, and the other part is not in the magnetic field. And in the case that the coil 7a is wound in a scroll-pattern, polarities of the side facing to the permanent magnets 5 of the permanent magnets 6 change alternatively in circumferential direction.

And the two parts of the coil 8a, in which electric currents flow parallel to the optical axis and reversely to each other, are arranged in a position that one part is in one magnetic field and the other part is in another magnetic field having a direction opposite to a direction of said magnetic field. Accordingly, the two parts of the coil 8a receives forces to same direction. A plurality of coils wound in a scroll-pattern can be provided on the coil member.

The described secondary movable coil member 8 is so held by retaining ring 14 as to be rotatable by making use of inner ring 2a of yoke 2 as a bearing to which wheel 8b provided to one end of the secondary movable coil member 8 is inserted. Coil pattern 8a of the secondary movable coil member 8 is in the scrolled or wavy form, as shown in FIGS. 3, 4. Flexible printed board is advantageous to form this coil pattern 8a, similar to the case of the primary movable coil member 7.

Numeral 15 is a stepwise cam gash provided to the outer end of the primary movable coil member 7. In the drawing the cam gash has three steps, however the number of steps shall not be limited thereto. Cam gash 15 is coupled to protrusion 16 provided to the other end of the secondary movable coil member 8. 17 is a spring member for regulating the initial position of the secondary movable coil member 8 so that the protrusion 16 may be positioned to mid point 15a of the cam gash 15. This spring member 17 is formed in a U-shape in the drawing and the bottom side 17a of the U-spring is fixed to the yoke 2, and free ends 17b, 17b' are coupled to notched stoppers 18a, 18b provided to the both sides of the protrusion 16. Accordingly, when no electric current is circulated the secondary movable coil member 8 is stayed in the initial position by the tension of the spring member 17, and when turning on a current the secondary movable coil member 8 is rotated from the initial position clockwise or counterclockwise by a signal given from a lens driving circuit of which will be described later. When the current ceased circulating, the coil member 8 is restored to the initial position by the spring tension, because the rotation thereof is against the free end 17b or 17b' of the spring member 17. The secondary movable coil member 8 will stay in a selected position that is a position corresponding to a step of cam gash 15 of the primary movable coil member 7, because a protrusion (not shown) provided to a suitable position of the coil member 8 hits a stopper (not shown) provided to yoke 2.

In the drawing, 19 is a spacer between rear lens groups 9a and 9b; 20 is a retaining ring for the rear lens groups 9a, 9b; 21 is a retaining ring for ball-bearing 11; 22 is a lens frame into which front lens groups 23a, 23b are fitted and on the outer circumference thereof there is provided with an electromagnetic driving device 25 for driving diaphragm-shutter blades 24 arranged between the lens frame 22 and lens frame 10 for rear lens groups 9a, 9b. In this electromagnetic driving device 25, a movable coil member 30 for driving the diaphragm-shutter blades 24 and a movable coil member 31 for controlling the moving range of the movable coil member 30 for driving the blades 24 are provided between fixed permanent magnet 27 adsorptively held by a disc type yoke 26 fitted into the lens frame 22 and a yoke 29 provided oppositely to the permanent magnet 27 with a certain space through the holder 28 of the magnet 27, so that the electromagnetic driving device 25 may be worked at a given speed with a given aperture. Numeral 32 is a retaining ring for front lens groups 23a, 23b, and 33 is a facing ring.

Figure 7:
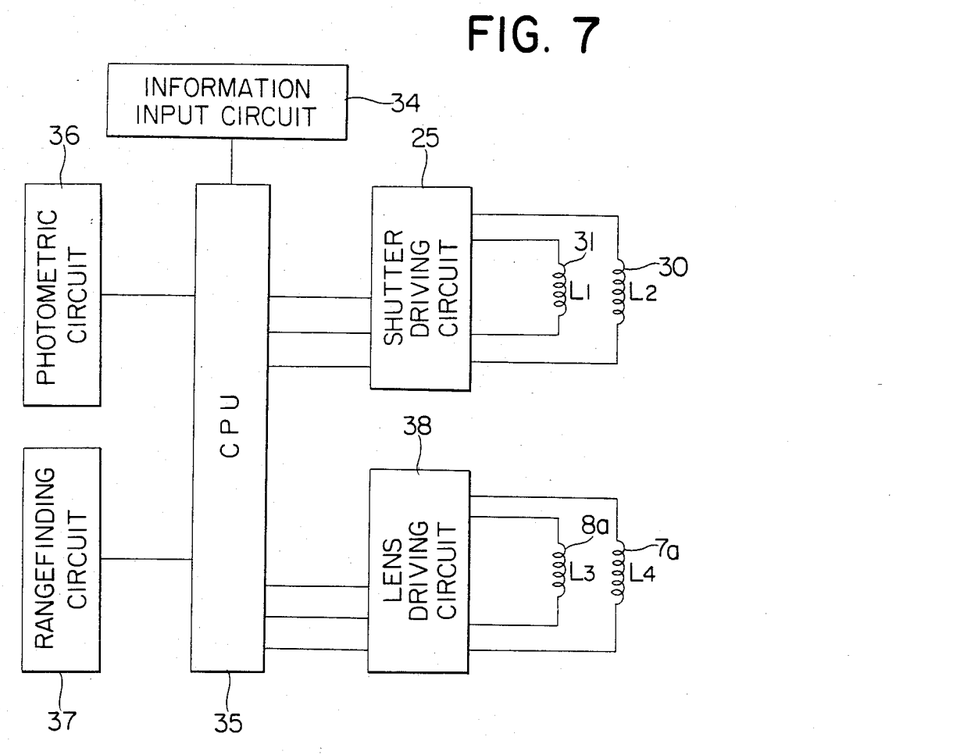
FIG. 7 is a block diagram of an electric circuit used in an embodiment of the invention.

FIG. 7 is a block diagram of an electric circuit, wherein an information input circuit 34 works when a release button (not shown) is depressed so that a film sensitivity information, a photographing mode information or the like may be fed in a CPU 35. In this moment, an exposure value information is fed into the CPU 35 from a photometric circuit 36 and a distance measurement information is also fed into the CPU 35 from a rangefinding circuit 37. When CPU 35 computes an exposure value information or a distance measurement information according to a photographing mode information or the like fed from the information input circuit 34, a diaphragm control signal, a driving signal and an electric current direction signal are fed into the electromagnetic driving device 25 for driving the diaphragm-shutter blades 24 so that the movable coil members 30, 31 of the electromagnetic driving device 25 are electrified. In the similar manner, a lens control signal, a lens driving signal and an electric current direction signal are fed into a lens driving circuit 38 and the movable coil members 7, 8 thereof are then electrified. Thus, the diaphragm-shutter blades 24 and the lens frame 10 of the rear lens group are operated according to the sequence shown in the time-chart of FIG. 7. To be more concrete, when a lens position is set by the CPU 35, the direction of the current is determined to be supplied to coil 8a of the secondary movable coil member 8. Then, the electric current direction signal is fed into the lens driving circuit 38 and successively a lens control signal is generated so that the coil 8a of the secondary movable coil member 8 may be electrified. After electrifying, the direction of the current is determined to be supplied to coil 7a of the primary movable coil member 7, and thus, the electric current direction signal is given to coil 7a of the primary movable coil member 7 through the lens driving circuit.

Figure 8:
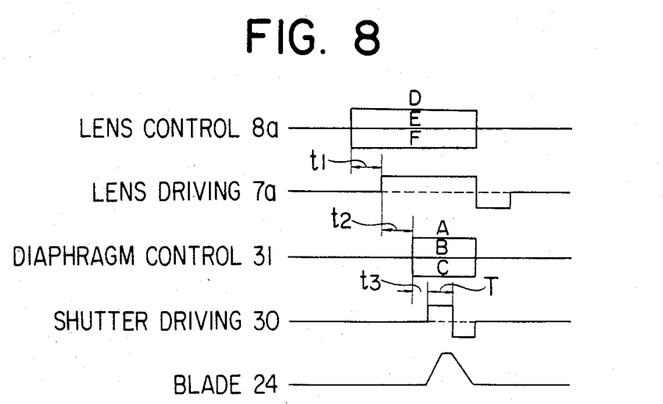
FIG. 8 is a time chart used in an embodiment of the invention.

In FIG. 8, $t_1$, $t_2$, $t_3$ are time lags, respectively; T is a shutter speed; and A through F illustrate the conditions of an electric current in the positive, the negative and the non-electrification. Next, the working will be described.

As described above, when a release button (not shown) is depressed, a distance measurement signal is given from range-finding circuit 37 to CPU 35 and the place where a lens stops is set, a control signal is given to lens driving circuit 38 and at the same time an electric current direction signal is fed into the lens driving circuit 38 so as to be suitable for the operational direction of secondary movable coil member 8, and thus, the secondary movable coil member 8 is stayed in the initial position thereof or is rotated therefrom clockwise or counterclockwise. In accordance with the secondary movable coil member 8 which stays in the initial position, to the right or to the left therefrom, the protrusion 16 thereof corresponds to either one of the mid point, a deeper gash 15b and a shallower gash 15c of the stepwise cam gash 15 of the primary movable coil member 7. In succession, when coil 7a of the primary movable coil member 7 is electrified and the primary movable coil member 7 travels straight on or moves strollwise, it starts to move to the right in the drawing against the tension of spring 13 so as to couple either one of the steps of the cam gash 15 to the protrusion 16 of the secondary movable coil member 8.

The movable range of the primary movable coil member 7 is thus regulated by the depth of the cam gash 15 corresponding to the protrusion 16 thereof. The movable range of this primary movable coil member 7 will determine the movable range of lens frame 10 to which rear lens groups 9a, 9b are fitted so that a focusing may be operated. For example, the mid point 15a of the cam gash 15 of the primary movable coil member 7 is brought into fixed focus, a deep gash 15b into a focus at the close distance and a shallow gash 15c into focus at infinity, and a taking lens may be thereby brought into each of three focal points; a fixed focal point, the focal point at the closest distance and the focal point at infinity, according to the positions of protrusion 16 of the secondary movable coil member 8.

Thus, when the lens is set to a position, movable coils 30, 31 of shutter driving circuit 25 are electrified, an exposure is controlled, and the shutter is released.

In this example, shutter unit 24 is fixed to lens frame 22 for the front group of the taking lens optical system and only the lens frame 10 fitted with the rear lens groups 9a, 9b is made movable by the primary movable coil member 7. However, it is needless to mention that it is also allowed to drive the whole unit of the taking lens system if an electromagnetic force is adequate to drive it.

In this example, the primary movable coil member 7 is depressed to move toward the front (to the left in the drawing) by spring 13 and is moved backward (to the right in the drawing) against the tension of the spring 13 when being electrified. However, the depressing direction of the spring may be reversed, and the relation between cam gash 15 and protrusion 16 shall not be limited to the positions shown in the drawing but to the other positions provided that the primary movable coil member 7 and the secondary one 8 may be correlatively positioned. It is allowed of course to provide the protrusion 16 to the primary movable coil member 7 and cam gash 15 to the secondary movable coil member 8.

Figure 6A:
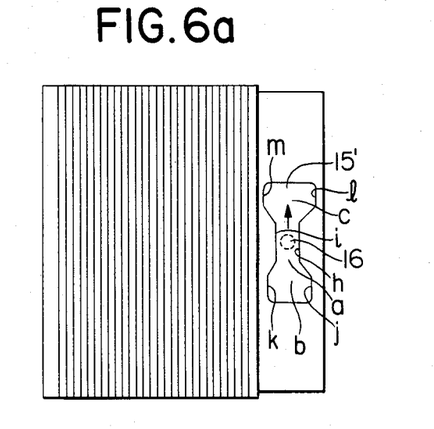
FIG. 6 is a relational view illustrating another type of control systems used in another embodiment of the invention in which the relation between the primary movable coil member and the secondary movable coil member is shown.
Figure 6B:
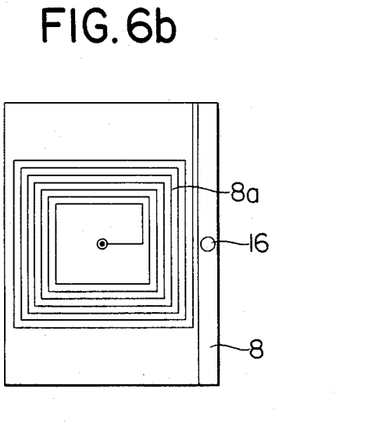

Further, there can be the other alternative structure in which stepwise cam gash 15 provided to the primary movable coil member 7 for driving a taking lens unit is replaced by an alley-like opening 15' having a narrow portion a and wider portions b, c provided to the both ends of the narrow portion a as shown in FIG. 6, and protrusion 16 of the secondary movable coil member 8 is coupled to the alley-like opening 5', and thereby the movable range of the primary movable coil member 7 may be adjusted in six steps. In this embodiment, when the protrusion 16 of the secondary movable coil member 8 is positioned at the narrow portion a of the alley-like opening 15', the movable range of the primary movable coil member 7 is adjusted within such a narrow range between the front point (i) and the rear point (ii) ; when the protrusion 6 is positioned at the intermediate wider portion b of the opening 15', the movable range is adjusted between the front point (iii) and the rear point (iv) ; and when the protrusion 16 is positioned at the widest portion c of the opening 15', the movable range is adjusted between the front point (v) and the rear point (vi) .

In the alley-like opening 15′, the space between the front point (v) and the rear point (vi) in the widest portion c of the opening 15′ corresponds to the positions of the taking lens from the infinity to the closest focus, and it becomes therefore possible to control delicately up to six steps from (i) to (vi). According to this embodiment, there may be enjoyed the advantages that an electric power can be effectively saved because the movable range is normally shortened in a high subject brightness range such as a bright and clear weather, provided that the positions of (i) and (ii) in the narrow portion a are brought into fixed focus and in the neighborhood thereof; and that a multistep control such as seven-step control having never achieved by any conventional electromagnetic driving means may be achieved by a simple mechanism provided that there is added with such a mechanism as a spring balancer to keep a taking lens at the mid point of the movable range of the lens.

Thus, according to this invention, it is characterized that the taking lens driving means of the invention comprises a plurality of movable coil members arranged so as to traverse the magnetic flux of the magnetic circuit formed by fixed permanent magnets and to surround the circumference of a lens unit. Among a plurality of the movable coil members, at least one of them is used as a movable coil member for driving a taking lens unit and the rest thereof are used for controlling the movable range of the movable coil member for driving the taking lens unit, and thereby the reciprocation movement of the taking lens unit may be readily controlled multistepwise, that is an excellent effect of the invention.

In the conventional systems in which a taking lens is electromagnetically driven to bring a subject into focus, all the controls may be performed according to the direction and the amperage of current electrifying the movable coil members, therefore, the control steps may be reduced at the time of driving the taking lens, and the control circuit and the control mechanism may be simplified. On the contrary, there is not provided with a gear drive mechanism so that a multi-step control will be very difficult even though such a simple control as the reciprocation movement of the optical system of a taking lens unit may be easily performed by changing the direction of current applied. To cope with this difficulty, it may be considered that a plurality of coils are successively electrified one after another to operate like a stepping motor, however, the means thereof is seriously complicated and is also less advantageous.

In this invention, the above-mentioned difficulties and disadvantages have been solved, and the invention has been described with reference to the embodiments thereof given above, a taking lens driving and controlling means relating to the invention is constructed in the way that movable coil member capable of driving the taking lens unit and movable coil member for controlling the former movable coil member, which is capable of moving clockwise or counterclockwise from the initial position thereof, the both of them are arranged to traverse the magnetic flux of a magnetic circuit formed of fixed permanent magnets so as to surround the circumference of the taking lens, and the movable range of the described movable coil member for driving the taking lens unit may be controlled according to a plurality of the working positions of the movable coil member for controlling. It is therefore characterized that it is easy to finely control the movement of the taking lens unit within the movable range thereof, and it is possible not only to satisfactorily cope with the increase of the control steps but also to contribute to miniaturize the camera body because the above-mentioned functions may be played by a simplified structure, and also that a power saving effect may be enjoyed because no electrification is required to the movable coil members when photographing in a fixed focus.

In the conventional systems in which a taking lens is electromagnetically driven to bring a subject into focus, all the controls may be performed according to the direction and the amperage of current electrifying the movable coil members, because of the electromagnetic driving system. A part of supplementary devices such as the above-mentioned motor drive system is therefore not required so that the miniaturization of the devices may be attained in this sense. Generally, when focusing from the infinity to the closest range by moving a taking lens, the movable range of the lens is extremely short such as the range of the order of from 1 to 2mm, and when the movable range is finely controlled within such a short range, the controlling mechanism and the like become minute or the response of such a controlling member cannot correspond to the high moving speed, so that the difficulty beyond control has been caused.

As described in the above embodiment, the above-mentioned problems have been solved by this invention, because the invention is characterized in that there are arranged to the position traversing the magnetic flux of a magnetic circuit formed of fixed permanent magnets surrounding the circumference of a taking lens with the primary movable coil member for reciprocating the taking lens unit in the direction of the optical axis thereof and the secondary movable coil member for regulating the movable range of the primary movable coil member so that the movable range of the primary movable coil member may be regulated by a hitting protrusion to be coupled to a hitting cam provided to a position corresponding to the primary and secondary movable coil members. It is therefore possible to display the excellent effect that a taking lens may readily be controlled precisely within the narrow movable range of the lens when focusing in operation or the like.

Further, in the conventional magnetic driving systems for focusing by means of a taking lens, and when the taking lens is moved by the magnetic driving means, it is preferred to drive the optical axis of the taking lens in the linear direction from only the viewpoint of the lens movement, however, from the viewpoints of various controls it may be considered that the rotary movement could be advantageous because the angles of the movement and the like may be effectively selected. In this case, the movement of the taking lens is different from such a two dimensional movement as a shutter is operated but is necessary to reciprocate in the direction of the optical axis. In order to reciprocate the taking lens conventionally with the rotation thereof about the optical axis, it has been required to form a movable coil member in the shape of a cylinder and to arrange a scroll-shaped or wavy shaped coil pattern to the outer circumference of the movable coil member. However, it has been very difficult to arrange such a scroll or wavy pattern made of a fine wire onto the outer circumference of the cylinder.

As described in the above embodiment, the above-mentioned problems have been solved by this invention, because this invention is characterized in an electromagnetic driving means in which a movable coil member is formed of a substrate comprising a non-magnetic material, and a flexible printed coil fixed to the substrate so that the movable coil member may be arranged to a position traversing the magnetic flux of a magnetic circuit formed of fixed permanent magnets. It is therefore possible to display an excellent effect that a coil pattern in the shape of scroll (including a wavy shape) may readily be formed on a cylindrical outer circumference of the movable coil member rotatable about the optical axis of a taking lens.

In the above-mentioned embodiment of this invention, the primary movable coil member 7 is formed into a body with lens frame 10 to which the rear lens group is fitted. However, there are some instances where the lens frame of the front lens group may also be united into such a body.

In this invention, as described above, there is formed into a body with the lens frame of a taking lens unit so constructed as to be movable by an electromagnetic driving means, and a non-magnetic material made movable coil member for driving the lens unit. Therefore, various excellent effects may be displayed such as that the optical axis of the taking lens and the center of the movable coil member coincide with each other without any adjustment so that the assembly effeciency improvement may be expected, the number of parts may be reduced, the embodiment of this invention may be incorporated into a camera recently miniaturized and thereby narrowed in the space inside, the total production cost of cameras may be greatly reduced, and the like.

What is claimed is:

1. A taking lens driving means comprising permanent magnet means provided fixedly inside of a lens barrel,
    a plurality of movable coil members arranged so as to traverse magnetic flux of a magnetic circuit formed of said permanent magnet means and to surround the circumference of the taking lens,
    wherein at least one of the movable coil members is for driving the taking lens unit, and the rest thereof are for regulating the movable range of the movable coil member for driving the taking lens unit.

2. A taking lens driving means as claimed in claim 1, wherein the movable coil member for driving comprises a coil wound in a direction of a circumference of the coil member for driving, and the movable coil member for regulating comprises a coil wound in a scroll-pattern.

3. A taking lens driving means as claimed in claim 1, wherein the movable coil member for driving comprises a coil wound in a scroll-pattern, and the movable coil member for regulating comprises a coil wound in a scroll-pattern.

4. A taking lens driving means as claimed in claim 3, wherein the movable coil member for driving comprises a plurality of coils wound in a scroll-pattern and the movable coil member for regulating comprise a plurality of coils wound in a scroll-pattern.

5. The taking lens driving means as claimed in claim 1, wherein the primary movable coil member reciprocating the taking lens unit in the direction of the optical axis thereof, and the secondary movable coil member rotatable about the optical axis of the taking lens and for regulating the movable range of the primary movable coil member are arranged to a position traversing the magnetic flux of the magnetic circuit formed of the fixed permanent magnets and surrounded the circumference of the taking lens, and the movable range of the primary movable coil member may be regulated by coupling a hitting cam provided to a position corresponding to the primary and secondary movable coil members to a protrusion to be hit against the cam.

6. The taking lens driving means as claimed in claim 1, wherein a movable coil member for driving which is capable of moving the taking lens unit and a movable coil member for regulating which is capable of moving clockwise or counterclockwise from the initial position thereof are arranged to a position traversing the magnetic flux of the magnetic circuit formed of the fixed permanent magnets surrounding the circumference of the taking lens, so that the movable range of the movable coil member for driving may be regulated according to a plurality of working positions of the movable coil member for regulating.

7. The taking lens driving means as claimed in claim 1, wherein a movable coil member is arranged to a position traversing the magnetic flux of a magnetic circuit formed of the fixed permanent magnets and surrounded the circumference of the taking lens in an electromagnetic driving means, said movable coil member comprises a non-magnetic substrate and a flexible printed coil fitted to the substrate.

8. The taking lens driving means as claimed in claim 1, wherein the lens frame of the taking lens unit constructed so as to be movable by an electromagnetic driving means and the substrate frame of the movable coil member for driving the lens frame are made of a non-magnetic material so as to form into one body.

* * * * *